United States Patent
Huang

[11] Patent Number: 6,138,472
[45] Date of Patent: Oct. 31, 2000

[54] ICE-STORING TANK FOR AN AIR CONDITIONER WITH AN ICE-STORING MODE

[75] Inventor: Chung-Ping Huang, Tainan Hsien, Taiwan

[73] Assignee: Chi-Li Industry Co., Ltd., Tainan Hsien, Taiwan

[21] Appl. No.: 09/371,852

[22] Filed: Aug. 11, 1999

[51] Int. Cl.[7] .................................................. F25D 17/02
[52] U.S. Cl. .............................. 62/434; 62/430; 62/436; 165/163
[58] Field of Search ........................... 62/434, 430, 436; 165/163, 168

[56] References Cited

U.S. PATENT DOCUMENTS

| | | | |
|---|---|---|---|
| 5,109,920 | 5/1992 | Merryfull | 165/163 |
| 5,423,378 | 6/1995 | Dillenbeck et al. | 165/163 X |
| 5,660,165 | 8/1997 | Lannes | 165/163 X |

*Primary Examiner*—Henry Bennett
*Assistant Examiner*—Chen-Wen Jiang
*Attorney, Agent, or Firm*—Rosenberg, Klein & Lee

[57] ABSTRACT

An ice-storing tank for an air conditioner with an ice-storing tank includes a temperature-preserving tank and a spiral pipe set positioned in the tank. The spiral pipe set consists of a bottom base, a plurality of upright long posts spaced around an outer circumferential edge of the bottom base, and a plurality of independent spiral pipe units orderly placed on the bottom base. Each spiral pipe unit consists of supporting rods radially arranged and a spiral pipe supported on the supporting rods. The outer end of each supporting rod is fixed with the upright long post, and two ends of each pipe have a joint. A vertical inlet pipe and a vertical outlet pipe are provided to stand just outside the bottom base, having a plurality of connecting mouths to connect to the joints of each pipe and their upper ends extending out of the temperature-preserving tank to function as an inlet and an outlet for freezing liquid.

5 Claims, 12 Drawing Sheets

ICE-STORING TANK FOR AN AIR CONDITIONER WITH AN ICE-STORING MODE

BACKGROUND OF THE INVENTION

This invention relates to an ice-storing tank for an air conditioner with an ice-storing mode, particularly to one convenient to maintain and repair so as to lessen expenditure for maintenance.

A conventional air conditioner with an ice-storing mode may operate for making and storing ice during an off-peak periods so as to store up freezing capacity of a compressor during the off-peak periods such as nighttime, using ice stored during the day instead of electricity.

Figure 9:
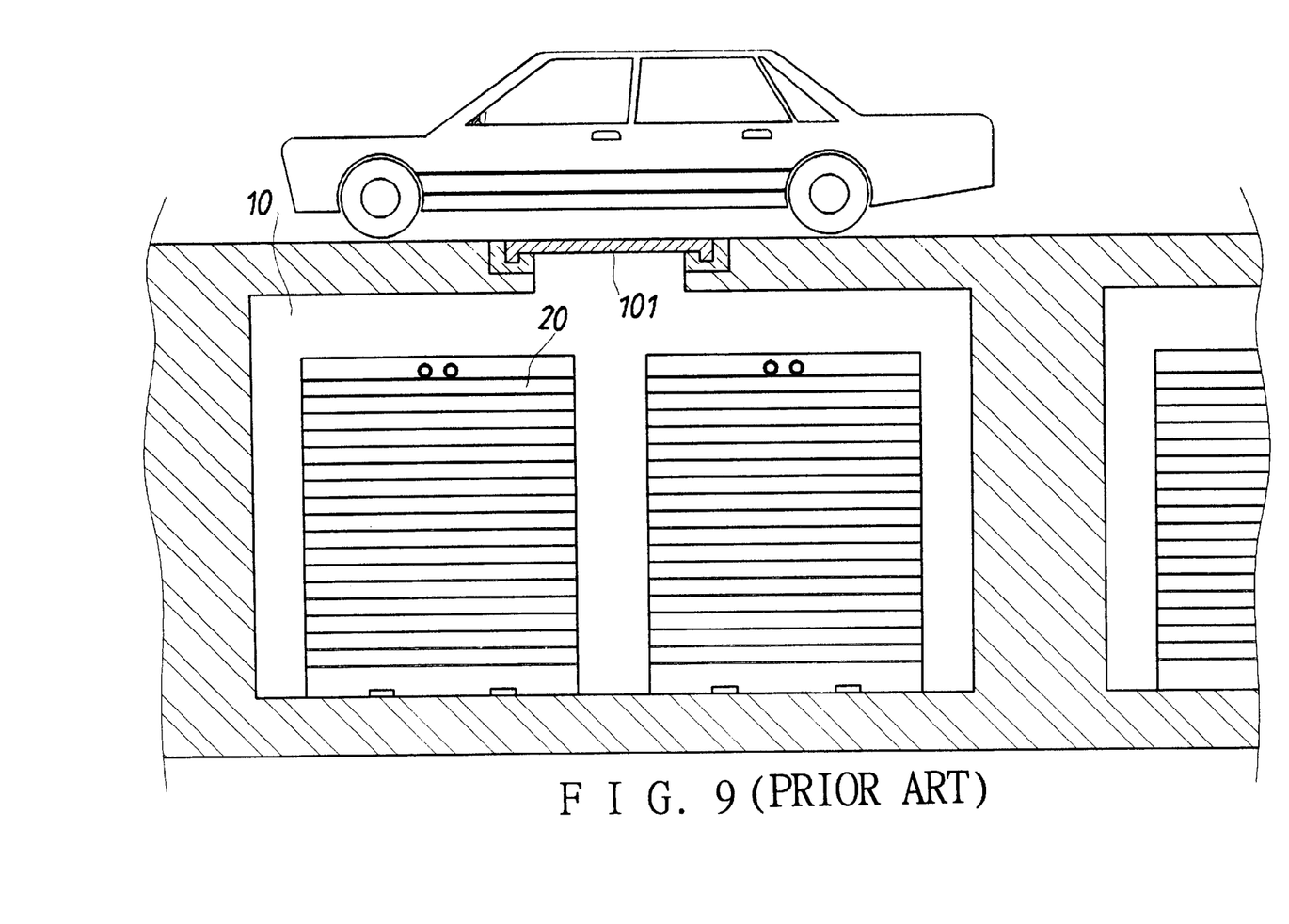
FIG. 9 is a cross-sectional view of a conventional ice-storing tank installed in a basement.
Figure 10:
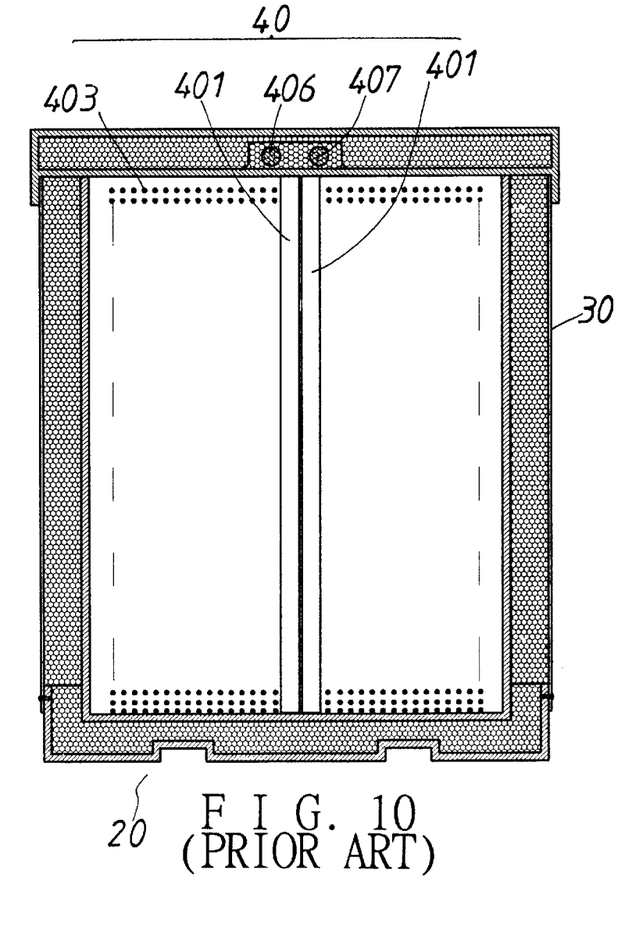
FIG. 10 is a cross-sectional view of the conventional ice-storing tank.
Figure 11:
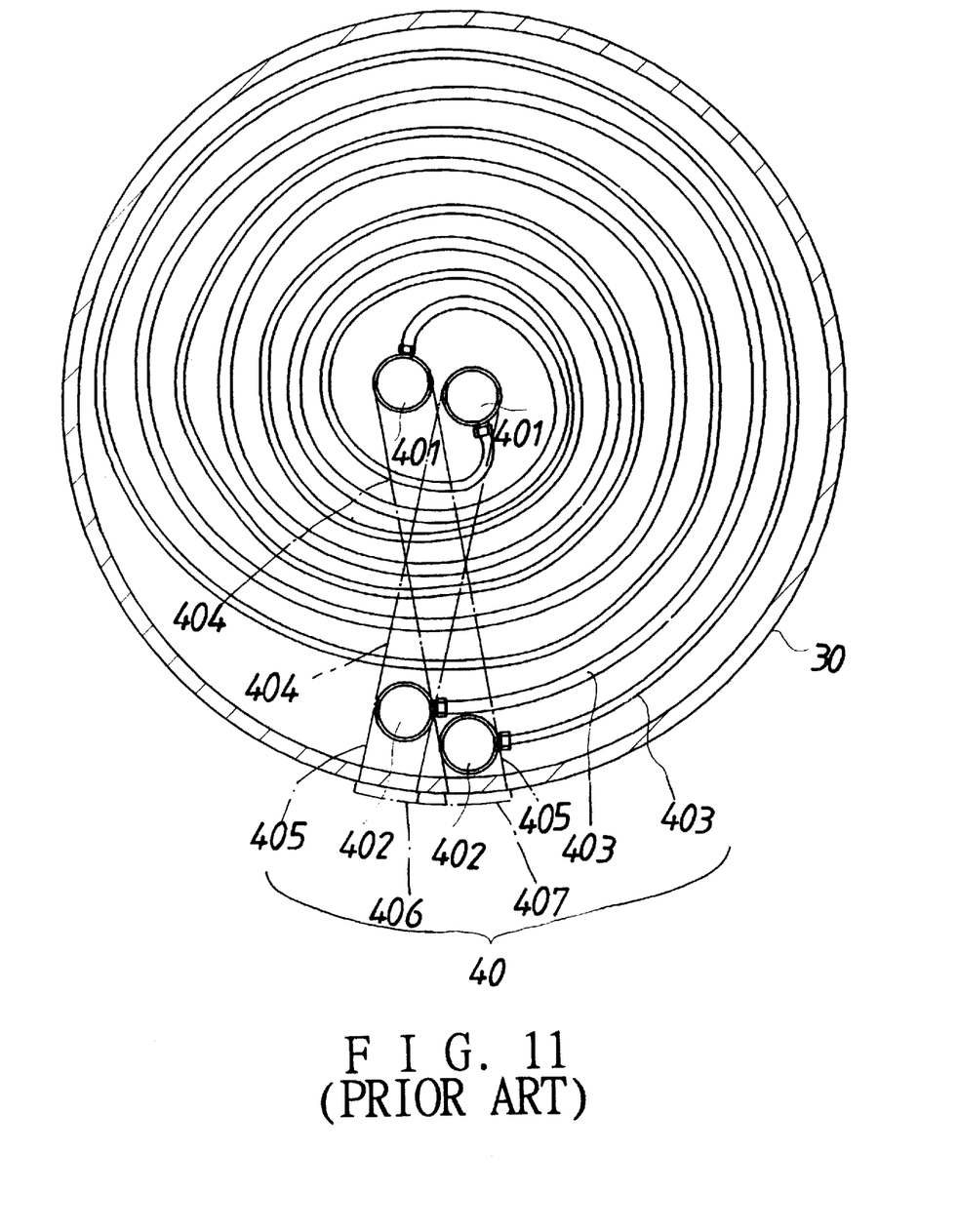
FIG. 11 is an upper view of the conventional ice-storing tank.
Figure 12:
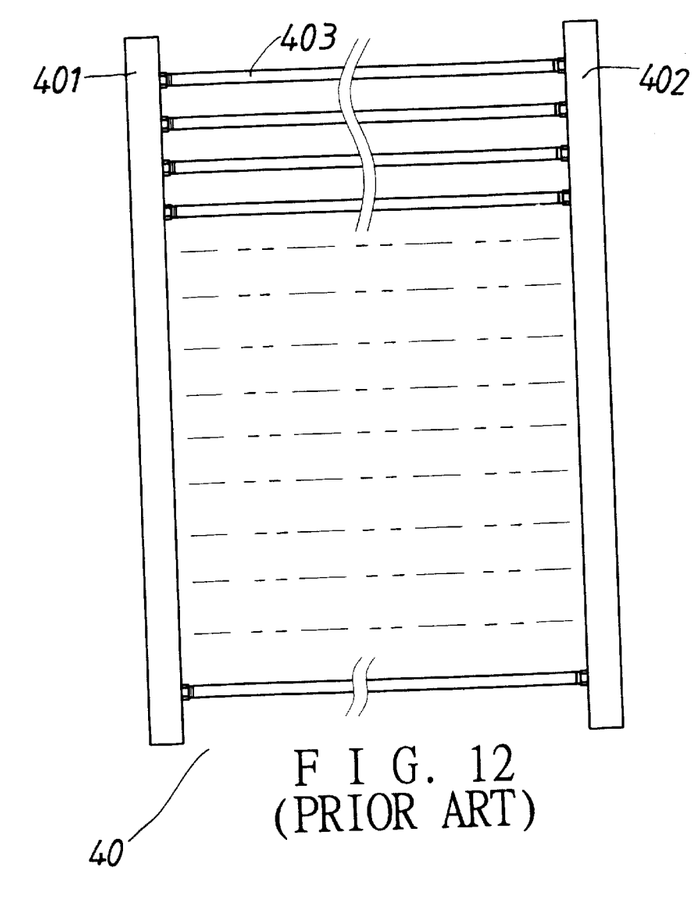
FIG. 12 is a side view of the tow sets of spiral pipes not yet formed into a spiral hape in the conventional ice-storing tank.
Figure 13:
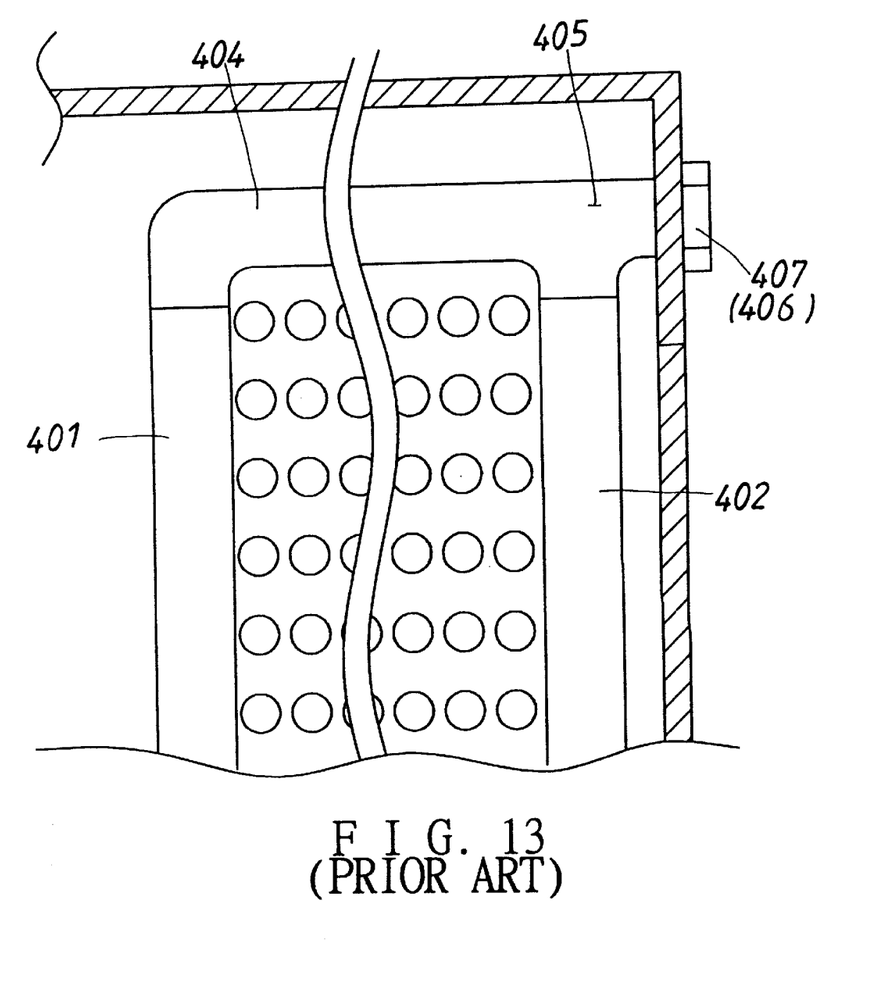
FIG. 13 is a cross-sectional view of the two spiral pipe sets communicating with each other of the present invention.
Figure 14:
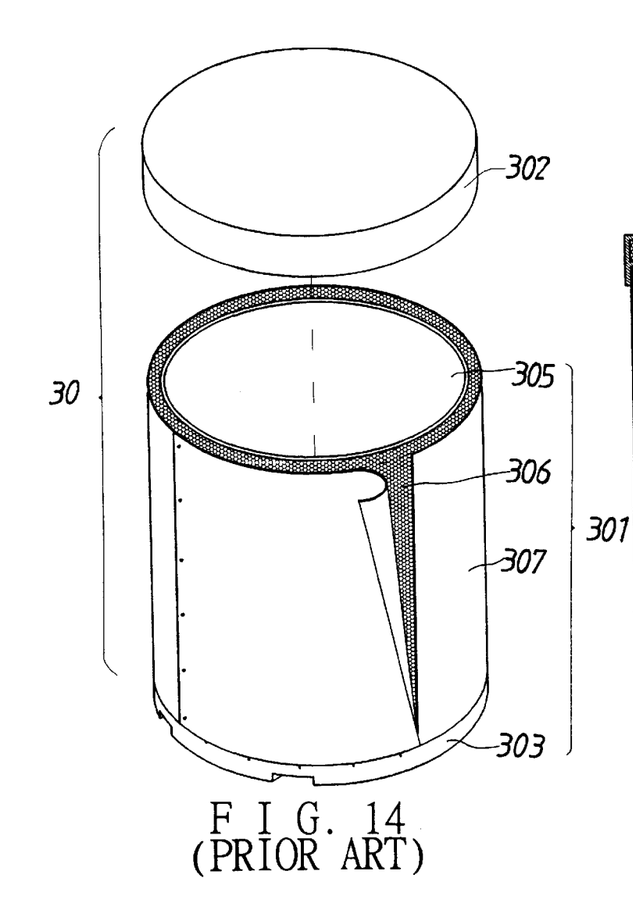
FIG. 14 is a perspective view of the ice-storing tank in the conventional ice-storing tank.
Figure 15:
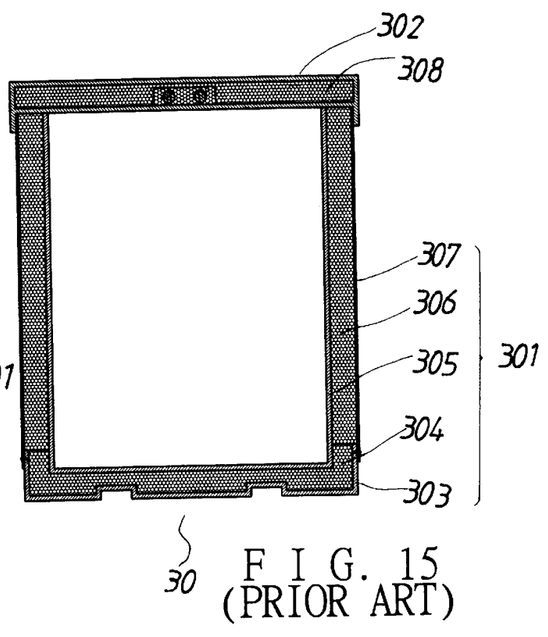
FIG. 15 is a cross-sectional view of the ice-storing tank in the conventional ice-storing tank.

Referring to FIG. 9, a conventional air conditioner with an ice-storing tank has an ice-storing tank 20 placed in a room 10 under a basement, which has a steel reinforcing concrete upper wall with a manhole 101 closed with a cap for only a worker to move in and out. As shown in FIGS. 10, 11,12 and 13, the ice-storing tank 20 consists of a temperature preserving tank 30 and two spiral pipe sets 40 placed therein. The spiral pipes sets 40 consist of a first and a second vertical pipes 401, 402, and may spiral empty pipes 403 connected between the first and the seond pipes 401 and 402. Then the two sprial pipe sets 40 have a front side of one abutting on a rear side of the other, respectively spiral-shaped, having inner ends of the two first pipes 401 connected with the two second pipes 402 via two connect pipes 404 so as to communicate the two spiral pipe sets with each other. Then the two second pipes 402 at the other ends of the two spiral pipe sets 40 respectively connected with an extension pipe 405, which extends out of the temperature-preserving tank 30 to function as an inlet 406 and an oulet 407 for freezing liquid (such as briny liquid) to flow in an out. As shown in FIGS. 14 and 15, the temperature-preserving tank 30 consists of a top cap 302 and a cavity 301. The cavity 301 includes a bottom 303 with a layer of temperature-preserving material 304 laid on the bottom 303, an inner tank 305 placed on the bottom 303 with a layer of temperature-preserving material 306 wrapped around the inner tank 305, an aluminum layer 307 overlaid around the temperature-preserving material layer 306. The top cap 302 with a temperature-preserving material layer 308 closing up the upper side of the temperature-preserving tank 30.

Figure 16:
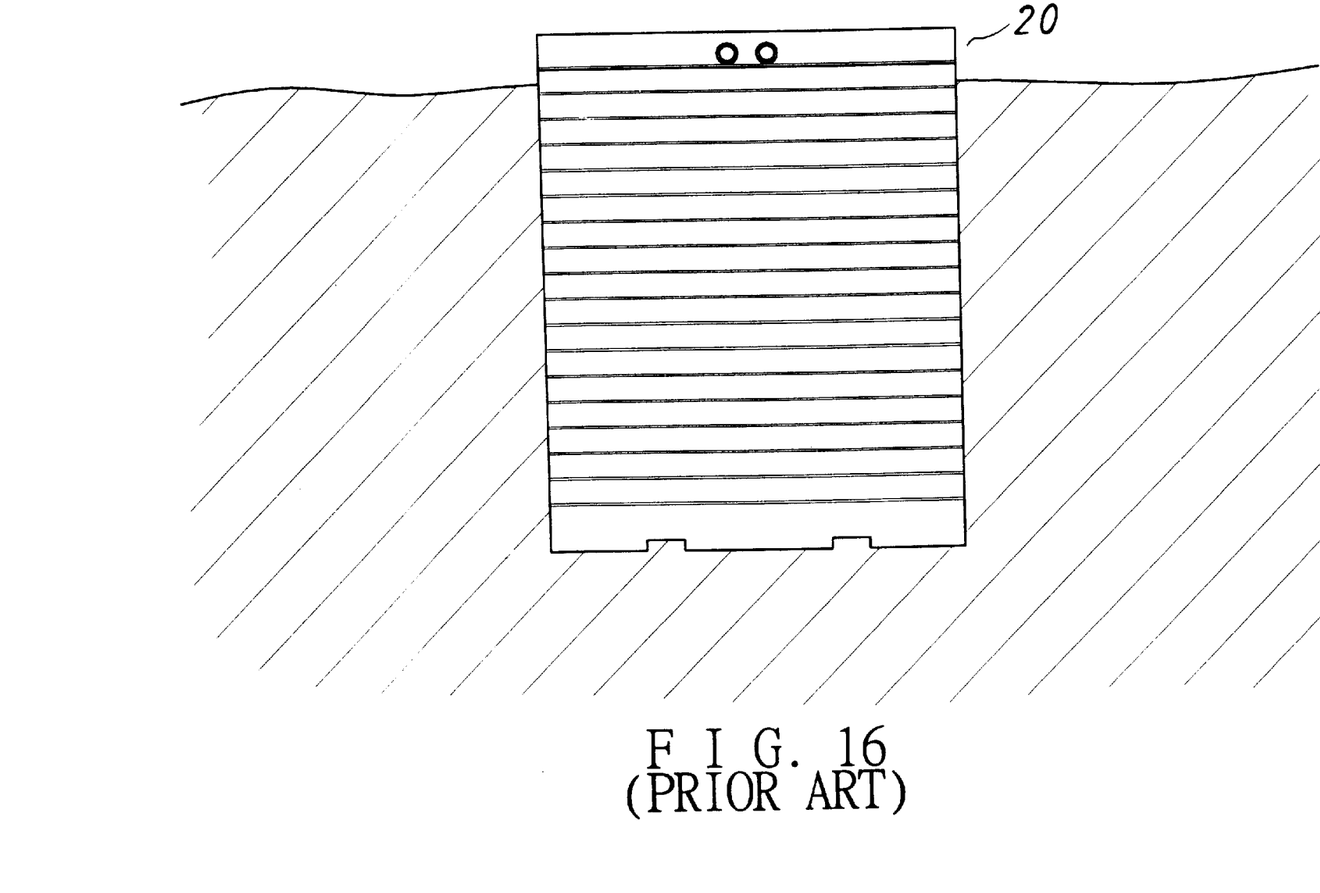
FIG. 16 is a view of the ice-storing tank buried under the ground outside a building in the conventional ice-storing tank.

Next, the ice-storing tank 20 is commonly placed in the room 10 under a basement, but it is sometimes placed under the ground outside a house or a building, as shown in FIG. 16.

However, the conventional ice-storing tank 20 involves the following drawbacks in using and manufacturing.

1. As the temperature-preserving tank 30 and the spiral pipe sets 40 contained therein have a very large dimension, it is inconvenient to repair or maintain the spiral pipe sets 40 if they need to. They have to be hoisted out of the tank 30, with the concrete upper wall with the manhole 101 firstly having to be removed off. Thus, it takes a large expense and troublesome work.
2. Manufacturing the temperature-preserving tank 30 is very troublesome.
3. The outermost aluminum layer 307 of the tank 30 may erode and become useless, and in addition, the aluminum layer 307 may quickly erode if the ice-storing tank 20 is installed under a basement of a building. So, the conventional ice-storing tank 20 may have a short service life.
4. The aluminum layer 307 has inferior effect in preserving temperature because of good heat transmitting property of aluminum plus inferior sealing function by means of rivets in fixing the aluminum layer 307.

SUMMARY

This invention has a purpose of offering an ice-storng tank for an air conditioner with an ice-storing mode, which includes a spiral pipe set placed in a temperature-preserving tank.

The feature of the invention is the spiral pipe set having a bottom base provided with plural upright long posts, a plurality of independent spiral pipe units placed one by one on the bottom base. Each spiral pipe unit consists of a spiral pipe and a plurality of supporting rods radially arranged for supporting the pipe. The outer end of each supporting rod is fixed with each upright long post, and the two ends of each pipe have a joint to threadably connected to one of many connecting mouths provided respectively on a vertical inlet pipe and a vertical outlet pipe. Then the upper ends of the inlet pipe and the outlet pipe extend out of the temperature-preserving tank to function as an inlet and an outlet for freezing liquid.

BRIEF DESCRIPTION OF THE DRAWINGS

This invention will be better understood by referece to the accompanying drawings, wherein.

DETAILED DESCRIPTION OF THE PREFERRED EMBODIMENT

A preferred embodiment of an ice-storing tank for an air conditioner with an ice-storing mode of the present invention as shown in FIGS. 1–4 includes a temperature-preserving tank 1 and a spiral pipe set 2 combined together.

The spiral pipe set 2, as shown in FIGS. 2–6, consists of a bottom base 3, a plurality of upright long posts 4 provided to stand up around the outer circumferential edge of the bottom base 3 and a plurality of independent spiral pipe units 5. Each upright long post 4 has a plurality of slots 41. The plurality of independent spiral pipe units 5 are positioned one by one on the bottom base 3, respectively having a spiral empty pipe 52 supported on a plurality of supporting rods 51 arranged in a radial condition. Each supporting rod 51 has a plurality of recesses 511 for the pipe 52 to fit therein, and a slot 512 each at two ends to correspond to the slot 41 of the post 4 for a screw 42 to combine tightly the supporting rod 51 with the post 4. Each pipe 52 has a joint 521 respectively at two ends. Just outside the bottom base 3 are provided with a vertical inlet pipe 6 and a vertical outlet pipe 7 respectively having a plurality of connecting mouths 61,71 to screw respectively with the joints 521 of the pipe 52. Further, the inlet pipe 6 and the outlet pipe 7 have upper ends extending out of the temperature-preserving tank 1 to function as an inlet 62 and an outlet 72 for freezing liquid to flow in and out.

In assembling, the plurality of spiral pipe units 5 are orderly placed on the bottom base 3 one by one, with the supporting rods 51 combined with the upright long posts 4 with screws, and with the joints 521 of the pipe 52 respectively threadably connected with the connecting mouths 61,71 of the inlet pipe 6 and the outlet pipe 7, finishing assembling the spiral pipe set 2. Then the spiral pipe set 2 is hoisted up, lowered down and positioned in the temperature-preserving tank 1 to complete the whole assemblage.

Figure 1:
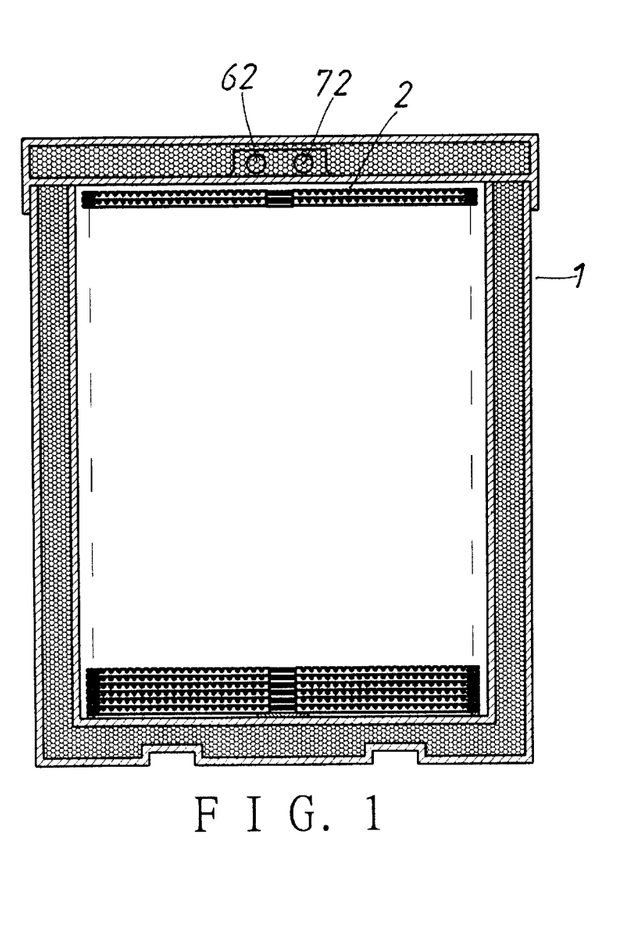
FIG. 1 is a cross-sectional view of an ice-storing tank for an air conditioner with an ice-storing mode of the present invention.
Figure 2:
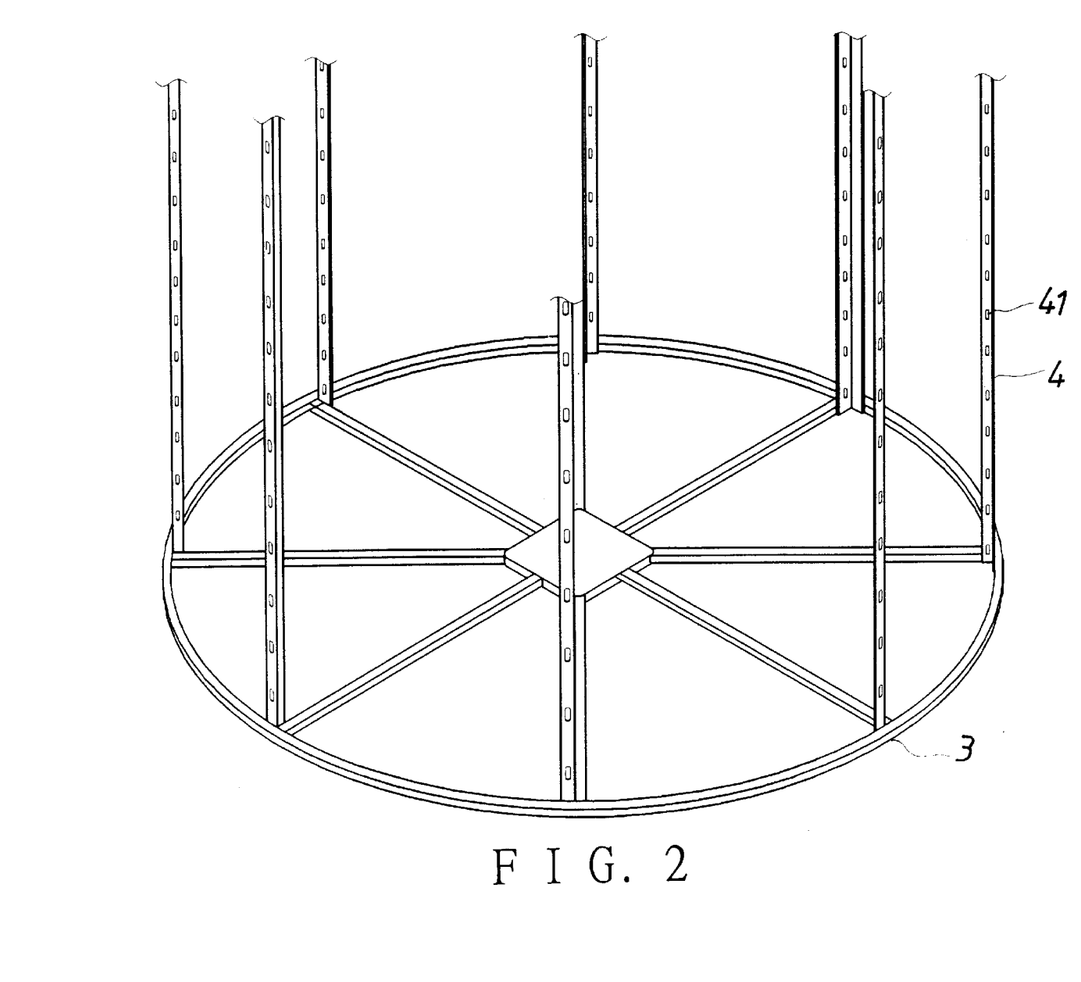
FIG. 2 is a perspective view of a bottom base and upright long posts of the present invention.
Figure 3:
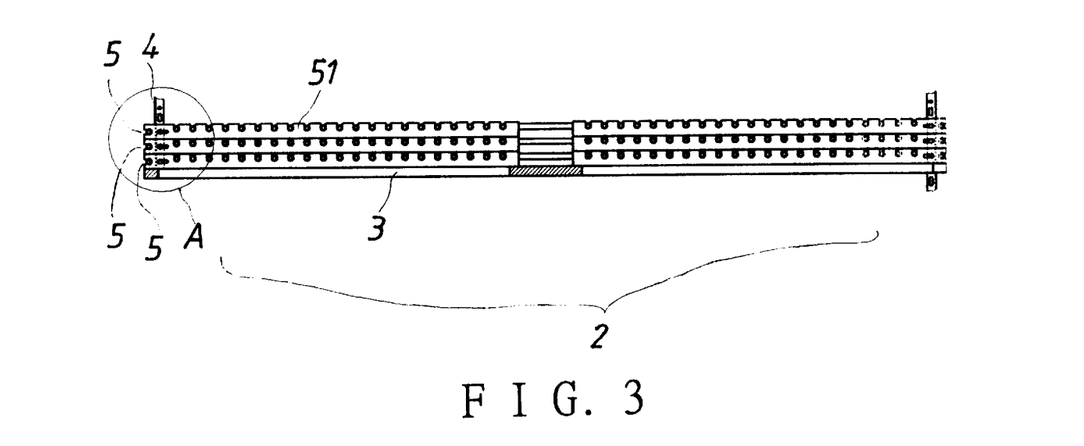
FIG. 3 is a cross-sectional view of the bottom base, the upright long posts and independent spiral pipe units combined together of the present invention.
Figure 4:
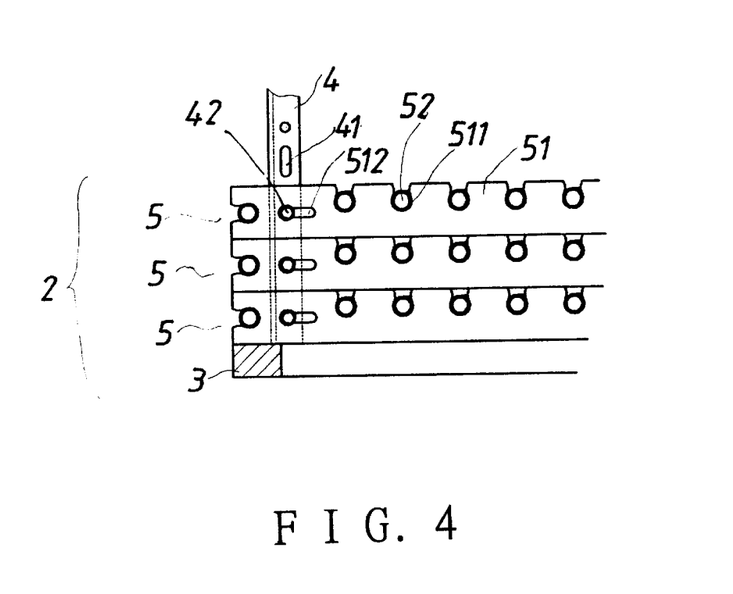
FIG. 4 is an enlarged view of the part marked A in FIG. 3.
Figure 5:
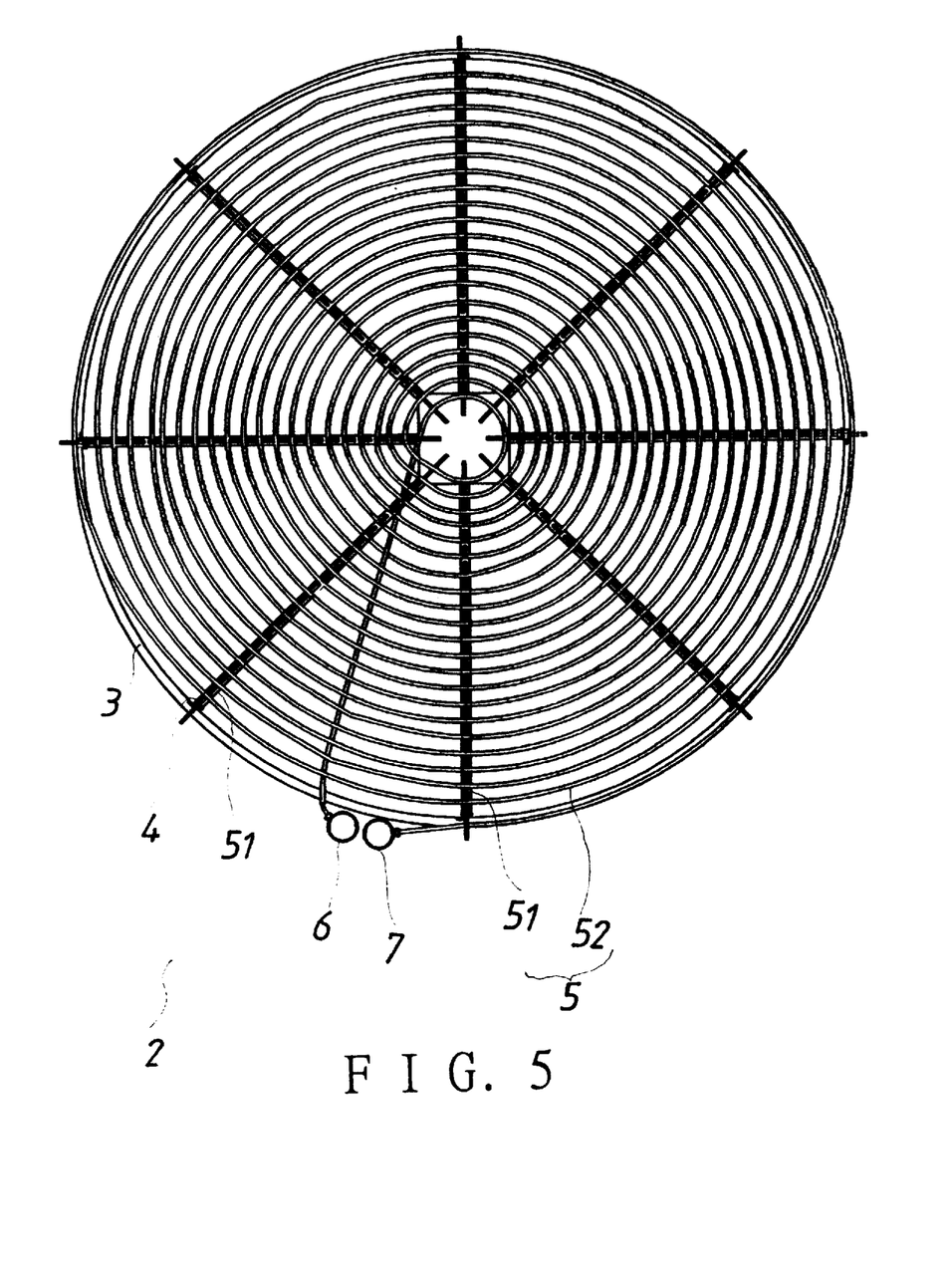
FIG. 5 is an upper view of the spiral pipes of the present invention.
Figure 6:
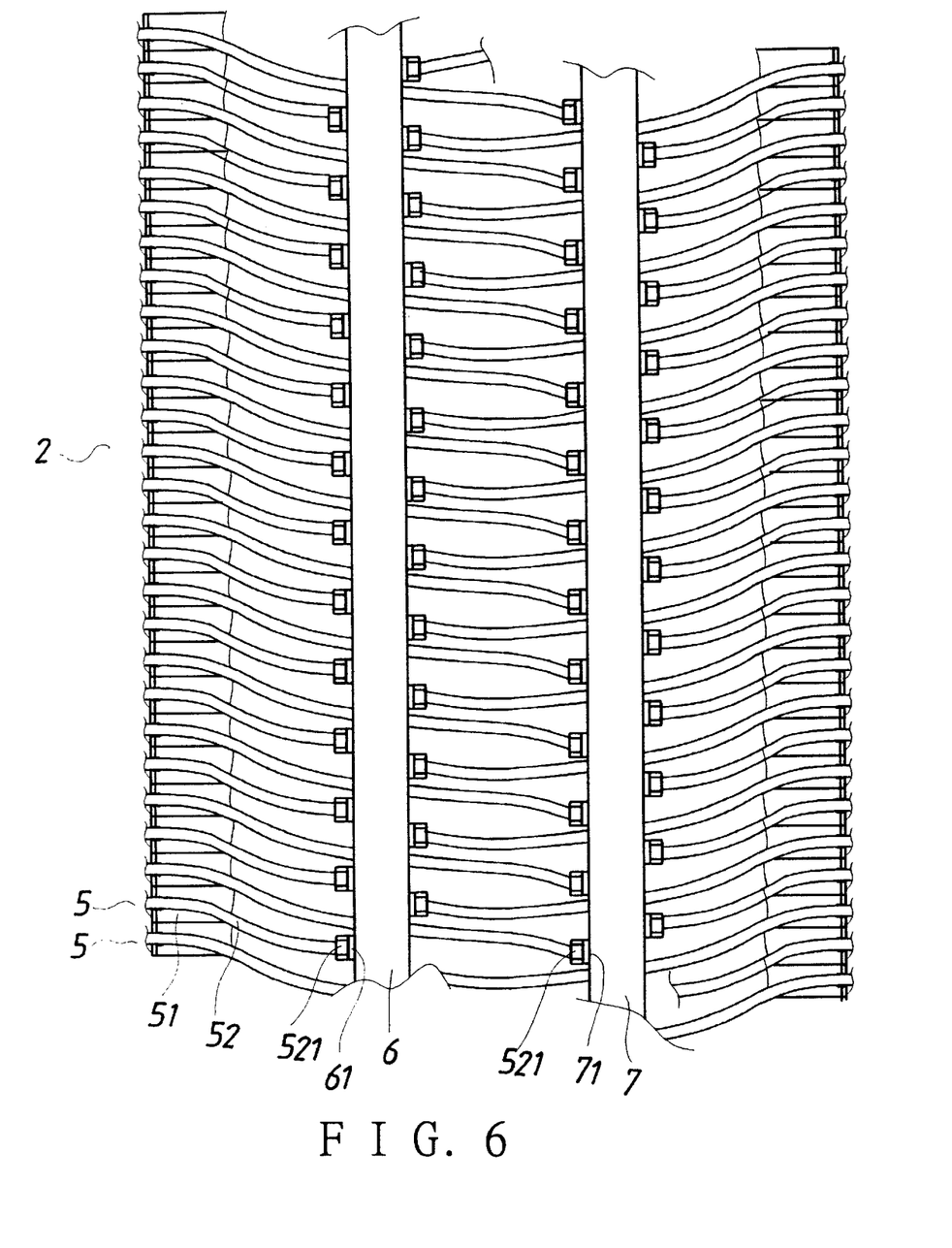
FIG. 6 is a front view of the spiral pipes of the present invention.

Provided that one of the pipes 52 of the spiral pipe unit 5 should leak, the joints 521 of the tow ends of that pipe 52 are separated from the connecting mouths 61, 71 and the screws 42 securing the supporting rod 51 with the upright long post 4 are loosened off. Then the independent spiral pipe unit 5 may be taken out, and be checked if there is any hole or not in the pipe 52. A new pipe 52 may replace the old one if there is one(s).

Figure 7:
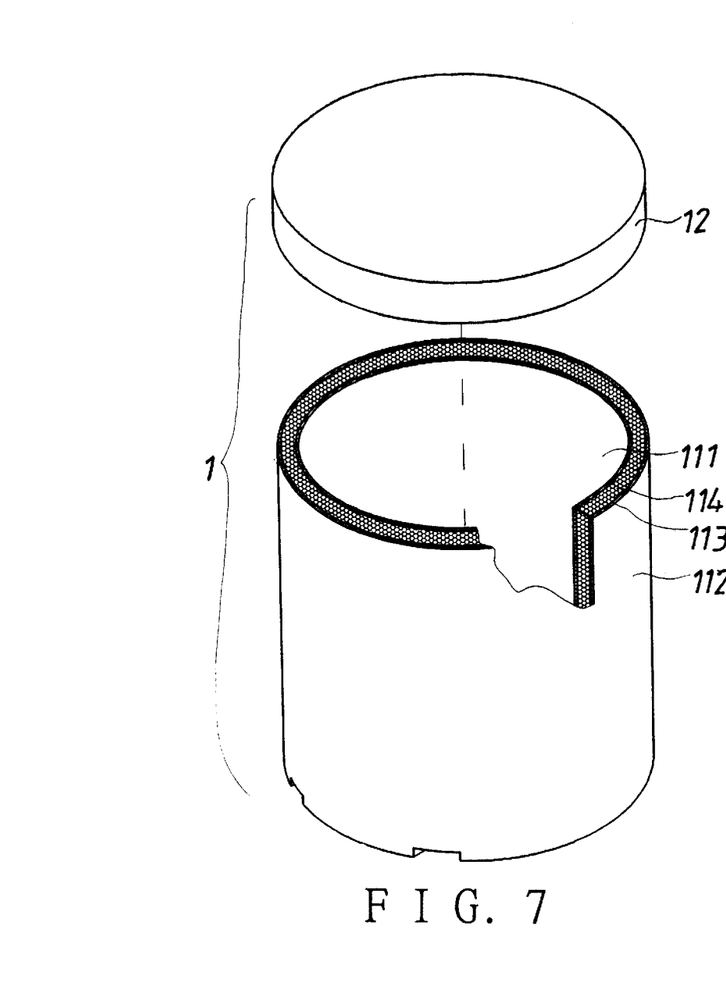
FIG. 7 is a perspective view of a temperature-preserving tank of the present invention.
Figure 8:
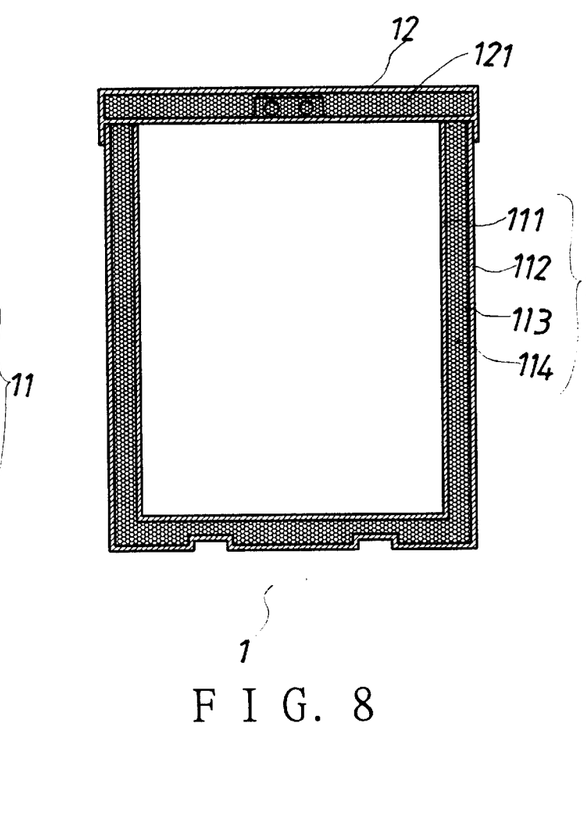
FIG. 8 is a cross-sectional view of the temperature-preserving tank of the present invention.

As shown in FIGS. 7 and 8, the temperature-preserving tank 1 has a tank body 11 has an inner tank 111 and an outer tank 112 containing the inner tank 111, with a space 113 formed between the inner tank 111 and the outer tank 112 for temperature-preserving material (such as PU foam material) 114 filled therein. Further, the cap 12 may have a layer of temperature-preserving material 121. The inner and the outer tank 111 and 112 may be made of anti-corrosion material such as polyethylene. And liquid temperature-preserving material 114 is filled in the space 113 between the inner and the outer tank 111 and 112. Then the cap 112 can be closed on the open upper side of the tank 11 after the liquid temperature-preserving material 114 cools and solidifies, completing the temperature-preserving tank 1.

As can be understood from the aforesaid description, the invention has the following advantages.

1. If there is a leakage in any of the pipes 52, the spiral pipe units 5 can be orderly taken out to check which one is leaking, not needing a troublesome work to break the floor to take out the whole spiral pipe set as needed in the conventional ice-storing tank.
2. Checking leakage can be accomplished by taking out a single one of the spiral pipe units 5, easy and convenient.
3. If a leaking pipe 52 is checked out, a new pipe 52 may replace the old one, or a whole old sspiral pipe unit 5 may be replaced with a new unit 5, not needing repair.
4. If a new pipe 52 replaces an old one, there may be no possible point to happen leakage as a repaired point may easily cause leakage.
5. The tank body 11 of the temperature-preserving tank 1 has a simpler structure to manufacture than that of the conventional temperature-preserving tank.
6. The outer tank 112 made of polyethylene endures corrosion, having a long service life.
7. The outer tank 112 is made into a U-shape and of polyethylene with low heat transmitting property, having excellent sealing and temperature-preserving feature.

What is claimed is:

1. An ice storage tank system for an air conditioner operable in an ice storage mode comprising:
    (a) a thermally insulated tank;
    (b) a support assembly disposed within said tank, said support assembly having a bottom base and a plurality of elongate upright posts coupled thereto and spaced one from the other in angularly offset manner;
    (c) at least one vertical inlet pipe and one vertical outlet pipe coupled to said support assembly for the passage of a freezing liquid therethrough, each said inlet and outlet pipe having formed thereon a plurality of vertically spaced connecting mouths; and,
    (d) a plurality of spiral pipe units coupled in independently removable manner to said support assembly and substantially arranged one over another, each said spiral pipe unit independently defining a fluid flow circuit extending between said vertical inlet and outlet pipes, each said spiral pipe unit including:
        (1) a plurality of radially extended supporting rods disposed in angularly offset manner, each said supporting rod having an outer end portion releasably secured to one of said upright posts of said support assembly; and,
        (2) a spiral pipe member supported by said supporting rods, said spiral pipe member having a pair of joint end portions and an intermediate portion extending spirally therebetween, one of said joint ends being threadedly coupled to one of said connecting mouths of said inlet pipe and the other of said joint ends being threadedly coupled to one of said connecting mouths of said outlet pipe;
    whereby each said spiral pipe unit is modularly disposed within said tank for independent replacement upon the occurrence of a defect therein.

2. The ice storage tank system as recited in claim 1 wherein each said supporting rod of at least one said spiral pipe unit is formed with a plurality of recesses for supportingly receiving a section of said spiral pipe member intermediate portion.

3. The ice storage tank system as recited in claim 1 wherein each said upright post of said support assembly has formed therein a plurality vertically spaced elongate slots and each said supporting rod of at least one said spiral pipe unit has formed at said outer end portion thereof an elongate slot partially aligned with one of said upright post elongate slots, said supporting rod being thereby disposed for adjustable fastening to said upright post.

4. The ice storage tank system as recited in claim 1 wherein said tank includes:
    (a) an inner body portion integrally formed of a corrosion resistant material and an outer body portion integrally formed of a corrosion resistant material substantially enveloping said inner body portion, said inner and outer body portions defining a fill space therebetween; and,
    (b) a thermal insulation material disposed in said fill space.

5. The ice storage tank system as recited in claim 4 wherein said inner and outer body portions of said tank are formed of a polyethylene material.

* * * * *